United States Patent [19]                [11]  4,217,369
Durst                                          [45]  Aug. 12, 1980

[54] MOISTURE RESISTANT NUT-LIKE FOOD COMPOSITION

[75] Inventor: Jack R. Durst, Champlin, Minn.

[73] Assignee: The Pillsbury Company, Minneapolis, Minn.

[21] Appl. No.: 713,077

[22] Filed: Aug. 9, 1976

[51] Int. Cl.$^2$ .............................................. A23D 5/00
[52] U.S. Cl. ..................................... 426/98; 426/104; 426/241; 426/803; 426/602
[58] Field of Search .................. 426/93, 104, 98, 602, 426/805, 629, 632, 243, 241, 803

[56] References Cited

U.S. PATENT DOCUMENTS

| | | | |
|---|---|---|---|
| 3,137,631 | 6/1964 | Soloway | 426/98 |
| 3,719,497 | 3/1973 | Galle et al. | 426/98 |
| 3,872,229 | 3/1975 | Durst et al. | 426/98 |
| 3,872,230 | 3/1975 | Sinner et al. | 426/98 |

*Primary Examiner*—Hiram H. Bernstein
*Attorney, Agent, or Firm*—Mart C. Matthews; Michael D. Ellwein

[57] ABSTRACT

Nut-like food compositions comprising a dispersion of oil droplets in a continuous phase of film-former are provided with substantially improved moisture resistance characteristics by employing an irreversibly heat-coagulable film-former, limiting the quantity of permanent plasticizer present in the formulation to a quantity no greater than the amount of heat-coagulable film-former, and exposing the dispersion to conditions sufficient to heat-coagulate the film-former and render it substantially less water soluble. The simulated nutmeats of this invention are particularly suited for use in moist food products.

21 Claims, No Drawings

MOISTURE RESISTANT NUT-LIKE FOOD COMPOSITION

BACKGROUND OF THE INVENTION

1. Field of the Invention

The present invention is directed to nut-like food compositions which retain a firm texture in high moisture environments, and to processes for preparing said compositions, particularly those compositions which retain their crunchy, nut-like chewing characteristics when employed in high-moisture baked goods.

2. Description of the Prior Art

The prior art contains several references to a class of food products comprising a dispersion of water-immiscible oil droplets in a continuous phase of hydrated hydrophilic film-forming polymer dried to form a cellular structure which simulates the texture of a natural nutmeat. For example, U.S. Pat. No. 2,952,544 describes products of this type which are produced by first admixing the oil component and the dry powdered film-forming component to form a slurry. Moisture is then added with vigorous beating until the particles of film-forming component hydrate and coalesce into a continuous phase which isolates and entraps the uniformly distributed globules of the oil component in a cellular structure. Dispersing the oil component throughout the continuous phase of hydrated film-former results in a gell-like mass which is then slowly dried without disturbing the cellular structure to gradually harden the continuous phase without displacing any of the oil.

The products have the characteristic crisp and oily character of natural nutmeats and, if the ingredients and procedures are selectively employed, may result in a product capable of replacing nutmeats, and even particular varieties of nutmeats. As used herein, the term "simulated nutmeats" is intended to designate the food products briefly described above and disclosed in detail in the aforementioned U.S. Pat. No. 2,952,544, which is incorporated herein by reference.

U.S. Pat. Nos. 3,872,229 and 3,872,230, also herein incorporated by reference, are directed to processes and products wherein greatly improved textural characteristics and eating qualities are achieved in the above-mentioned simulated nutmeat products by forming and mixing the gell-like dispersion of oil component in hydrated film-forming component under conditions which exclude gas; for example, by forming and mixing the dispersion under a vacuum. Although these improved products are quite satisfactory as nutmeat replacements for eating "out of hand", their desirable, firm textural characteristics have proven difficult to retain when the products are exposed to high moisture environments for substantial periods of time; for example, as is required when the simulated nutmeat is included in another food product having a relatively high moisture content.

Coating the individual pieces with an edible moisture resistant coating; for example, by the procedures set forth in U.S. Pat. No. 3,798,338, as mentioned in the above-cited patents, has achieved some success in preventing the simulated nutmeat pieces from becoming soggy or soft in moist food products, especially those products stored at low temperatures such as ice cream. However, this technique is largely dependent on obtaining a substantially pin-hole free coating and has limited application in food products where the pieces are not only subjected to high moistures but also to high temperatures; for example, as is typical of use in most baked products.

Many hydrophilic film-formers, particularly various protein materials, are known to be irreversibly coagulated or denatured by the application of heat or other kinds of energy. In this coagulated state, the previously water-soluble film-forming compound becomes substantially and permanently less water soluble through a type of cross-linking or polymerization reaction. The use of such heat-coagulable film-formers is known in the encapsulation art as a means for providing water-insoluble shells around individual droplets of water-immiscible, and frequently volatile liquids. For examples of such prior art uses of heat coagulable film-formers, see U.S. Pat. Nos. 2,969,330; 3,137,631; and 3,406,119. Film-formers inherently having heat-coagulating properties, particularly albuminoid proteins, have also been previously employed in the formation of the subject simulated nutmeat products because their superior film-forming properties are particularly advantageous in the formation of the continuous phase of the products. However, the utilization of these heat-coagulation properties to provide a substantially more moisture resistant product has heretofore been unknown and unappreciated.

SUMMARY OF THE INVENTION

In accordance with the present invention, substantial improvements are achieved in the ability of the above-described food products to retain a firm texture despite exposure to high-moisture conditions for substantial periods of time. In its more basic aspects, the invention comprises an improvement in the formulation and process of the prior art whereby at least a portion of the film-forming component admixed with the oil component to form the gell-like dispersion is adapted to irreversibly coagulate upon the application of heat. Although substantial improvements in moisture resistance may be achieved by such selection and control of the film-forming component above, it has also been found that the presence of excess amounts of permanent plasticizer, commonly found in prior art simulated nutmeat formulations for taste and texture modification, has a deleterious effect on moisture resistance and may destroy the improvements achieved by the use of a heat-coagulable film-former. Therefore, it is essential in the practice of this invention that the quantity of any permanent plasticizer present be limited to an amount no greater than the total amount of irreversibly heat-coagulable film-former present. When the resultant dispersion is exposed to conditions sufficient to irreversibly heat-coagulate the film-former so adapted, a simulated nutmeat of substantially improved moisture resistance is provided.

In preferred embodiments of this invention, formulations and processes are provided to produce simulated nutmeat products which are suitable for employment in moist food products. Particularly preferred products of this invention typically comprise on a dry weight basis about 20–40% dried comminuted No. 1 wheat germ, about 5–15% dried egg albumin, about 50–60% vegetable oil and about 0–9% sugar with a moisture content of about 2–5%, although the composition may vary considerably depending on the end use, as described in greater detail hereinafter. These products retain a firm nut-like texture, for example a pecan-like texture, after being baked into a moist (about 30% moisture) breadstuff from a dry convenience baking mix, and subsequently being stored for the normal shelf-life of that baked product; for example, for about 48 hours at room temperature and humidity.

DETAILED DESCRIPTION

In general, the nut-like food compositions of the present invention are produced by utilizing the ingredients and procedures used in the prior art, and particularly in the aforementioned incorporated patents. However, the present invention teaches a novel process for selecting and combining these ingredients to form a simulated nutmeat product of vastly improved moisture resistance. The term "moisture resistance" is used herein to designate the characteristic property of the subject simulated nutmeats whereby their initial crisp and firm texture is retained without significant softening in high-moisture environments.

As in the previously discussed procedures, the first step in forming the nut-like composition of the invention comprises blending the film-forming component (hereinafter "film-former") with the oil component to form a substantially smooth slurry. Then, just enough water is added to hydrate the film-former and after all of the water is introduced, the slurry is agitated at high speeds until a viscous and stable dispersion results. To achieve maximum moisture resistance and the desired texture, the dispersion is formed with the minimum amount of water required for stability and under conditions which exclude gas, for example, under a vacuum of at least ten inches of Hg gauge. Procedures for accomplishing such dispersion formation are set forth in detail in the U.S. Pat. Nos. 3,872,229 and 3,872,230, incorporated hereinbefore.

The formation of a viscous dispersion characterizes the point at which the oil component is dispersed throughout a continuous matrix of film-former and can be accomplished in several minutes with any of the conventional standard high-speed food mixers. The gell-like dispersion is then extruded into sheets, ribbons, bands, or other forms as desired, preferably having a thickness less than about ½", most preferably about ⅛"-¼". Water that is present in the continuous phase of the dispersion is then removed by slowly drying the product to form a firm, continuous cellular structure in which the oil droplets remain entrapped in cells.

Any film-former previously employed to produce simulated nutmeats of the prior art is contemplated as suitable for serving as the basic film-former component in the products of this invention. These materials in general, comprise edible hydrophilic polymers which form a film around an edible oil droplet using known processes. As examples of such film-formers, mention may be made of non-fat milk solids, sodium caseinate, calcium caseinate, soy protein, egg albumin, egg yolk, wheat germ, gelatin, soy flour, bean flour, corn germ, dried whey, gelatinized starch, fish protein, bran protein, gum arabic, and hydrophilic colloids such as carboxymethyl cellulose, agar agar, guar gum, carboxypropyl cellulose, carrogeenan and combinations thereof.

As previously stated, it is important in the practice of the present invention that at least a portion of the film-former employed be adapted to irreversibly heat coagulate. For the purposes of this description, the phrase "irreversibly heat-coagulate" and like terms are intended to mean the process by which the film-former is made significantly and permanently less water-soluble by the application of heat or other kinds of energy such as ultraviolet light, ultrasonic sound, or microwave energy. Several methods are available for making the required proportion of film-former heat-coagulable. In one important method of practicing the invention, the film-forming component comprises one or more water-soluble proteins which are denatured (coagulated) by the application of heat during the drying steps of the preparation process. These proteins may be used in combination with other film-formers which are not heat-coagulable, or may comprise the entire film-forming component. Sufficient amounts of total film-former are preferably used to form a fairly substantial film around the edible oil droplets since insufficient quantities of film-former may result in a thin film which is readily softened by exposure to moisture. Although a lesser quantity may be adequate in certain limited situations, satisfactory results in accordance with this invention have been achieved when the irreversibly heat-coagulable film-former is present in a quantity equal to about 5-20% by weight of dry materials.

Egg albumin has proven especially valuable as a source of heat denaturable protein film-former since, in addition to its film-forming and heat denaturable properties, egg albumin is also a good emulsifying agent which aids in the dispersion of the water-insoluble oil components. Heat denaturable proteins, other than egg albumin, which are contemplated as being suitable for use in the film-forming component of this invention include blood, other albuminoid proteins such as lacta albumin, blood plasma, globulin, myosin, glutelin, excelsin, edestin, arachin, casein and like water soluble proteins and their mixtures which are heat-coagulated. Other non-protein heat-coagulable film-formers may also be used such as, for example, polyvinyl alcohol and polyvinyl pyrrolidone.

Although the use of egg albumin is presently preferred as the main source of heat-coagulable film-former from a performance standpoint, this protein material is relatively expensive. Therefore, it may be considered desirable to utilize one of several techniques which allow for the use of more economical sources of this ingredient of the invention. For example, the conditions and/or procedures of the process may be modified so as to render heat-coagulable certain other more economical film-formers which may not otherwise exhibit this property under the standard conditions.

As one example, the alkali metal caseinates, such as sodium and calcium caseinate, are not heat-coagulable at temperatures normally used for drying the product. However, it is contemplated that, if sufficient pressure is applied during drying, the product may be exposed to the higher temperatures which are required to irreversibly heat-coagulate these caseinate proteins; for example, temperatures over the boiling point of water, without deleteriously affecting the product.

Another technique which may be useful for providing an economical source of heat-coagulable film-former is to treat wheat germ so as to render its more of its protein components heat-coagulable. The commercial wheat germ product is in fact a composite of several substances which may vary in relative proportions depending on its source and grade. Preferred in the practice of this invention is the grade of wheat germ designated as "No. 1" wheat germ derived from hard red spring wheat. The proximate composition of a typical mill mix of this wheat germ has been determined to be as follows:

Protein: 30.9%

Fat: 12.6%
Ash: 4.3%
Starch: 10.0%
Pentosans: 3.7%
Sugars: 16.6%
Undetermined: 8.4%
with the protein comprising:
Albumin: 30.2%
Globulin: 18.9%
Gliadin: 14.0%
Glutenin: 0.3%
Insolubles: 30.2%
Other Nitrogen sources: 6.4%
(Wheat Chemistry and Technology; Pomeranz, Y. 1971)

Although a large percentage of the wheat germ component does not contribute to the film-forming function, it is nonetheless a preferable source of film-former for the products of the invention since it is readily available, economical, and imparts to the product a desirable nutty flavor and texture when used in moderate quantities. However, it has been found that when large amounts of wheat germ are used, for example, around 50% (dry weight basis), the texture and eating characteristics are less desirable, possibly because of the large amount of starch which is introduced by the wheat germ. One problem encountered with wheat germ is its tendency to rapidly deteriorate primarily due to rancidity of the oil contained in the product. However, this problem may be readily overcome by toasting of the wheat germ, or preferably, by the milling process set forth in U.S. Pat. No. 3,783,164. The latter process involves impact grinding the wheat germ to a specific particle size and drying the resultant particules in a turbulent oxygen-containing atmosphere in order to neutralize the enzymes of the wheat germ.

As shown in the above composition, only about 30% of the wheat germ protein (albumin) is film-forming and heat-coagulable. However, it is known that the globulin protein comprising about 19% of the total protein in wheat germ is soluble in dilute salt solutions. If such a salt solution were utilized to hydrate the film-former, a large portion of the globulin protein may be solubilized and made heat-coagulable. It is also known that the presence of salts is disruptive to the stability of dispersions such as those forming the structure of the present simulated nutmeat products and, therefore, the concentration of salt in the system should be carefully controlled. To demonstrate the feasibility of this approach, a control product was prepared comprising about 37% ground dried wheat germ, 37% soy oil and 26% water (formula weight basis). This product was 50% wheat germ/50% soy oil on a dry weight basis. A series of test samples were prepared by adding to the control formulation sufficient NaCl (in the water) to provide 0.25%, 0.50%, 0.75%, 1.00%, and 1.25% NaCl on a dry weight basis. All samples were evaluated for moisture resistance in accordance with the procedure set forth in Example I hereinafter. At low levels of added NaCl, i.e. 0.25% and 0.50%, the products were less moisture resistant than the control, most likely due to the fact that the addition of neutral salt tends to destabilize the dispersion at this level. At levels of salt between 0.75% to 1.00%, the products were more moisture resistant than the control since it is felt that this amount of salt solubilizes the globulins in the wheat germ thereby increasing the amount of heat-coagulable film-former present. The heat-coagulation properties at this salt level overcome the adverse effect of the salt on the dispersion and a more moisture resistant product results. At the higher level of salt (1.25%), moisture resistance again is reduced because the destabilizing effects of added salt on the dispersion are greater than the moisture resistance of the additional heat-coagulable film-former made available.

Still another technique which could be employed to render the film-former heat-coagulable would be to expose the product to very high temperatures for a short period of time as a final step in the drying step. This approach is particularly advantageous since it imparts the moisture resistance properties (and, therefore, the ability of the product to take up *or retain* moisture) after the drying step and thereby may significantly reduce the drying time required. To demonstrate the feasibility of this approach, a product utilizing a blend of film-formers comprising 9% wheat germ, 3.65% egg albumin, and 7.4% calcium caseinate (dry weight basis) and dried to a moisture content less than 2% was subjected to temperatures of around 250°–300° F. for about 35 seconds in a microwave oven and exhibited an increase in moisture resistance of about 27%. Another formulation comprising no egg albumin, 9% wheat germ and 10.96% calcium caseinate (dry weight basis) showed a 28% increase in moisture resistance after a 40-second microwave oven treatment.

Regardless of the particular technique employed, it should be understood that the essence of this particular aspect of the invention is to provide a film-forming component at least a portion of which is adapted to irreversibly heat-coagulate, i.e. to render the film-forming component significantly and permanently less water soluble upon the application of heat or heat energy by the above techniques or others, thereby decreasing the propensity of the film-former to become plasticized (softened) by the uptake of moisture from its environment.

The film-formers may be intermixed and proportioned, and within certain limits, may have fillers added thereto at any stage in the process prior to drying. The flavor and texture of the ultimate product may be altered in a variety of ways without changing the character of the physical structure or the procedure by which such structure is obtained. In some instances, a hydratable film-former may be employed naturally having filler portion which does not interfere with the film-forming portion in producing cellular structure such as the aforementioned comminuted wheat germ. Preferably non-film-forming filler material comprises about 0–40% of the dry weight of the product. When wheat germ is used as both a filler and film-former, a quantity of wheat germ equal to about 20–40% of the dry weight of the product is preferred.

Although fillers may be used to achieve the desired flavors or textures in accordance with conventional practices in the art, it has been found that some filler materials act as permanent plasticizers in the system and may have a deleterious affect on the moisture resistance of the product. In the context of this invention, the term "permanent plasticizer" designates any substance which is added to or is included in the components of the formulation and remains in the final nutmeat product to soften or otherwise modify its textural characteristics. This is contrasted with the role of water as a "temporary" plasticizer which is essentially removed from the final product by drying. In accordance with the present invention, the quantity of any such permanent plasticizer(s) present in the formulation must be limited to a quantity no greater than the total amount of irreversibly heat-coagulable film-former. As examples of such permanent plasticizers which must be so limited in the formulation, mention may be made of polysaccharides such as glucose, sucrose, or lactose; polyhydric alcohols, such as glycerin, and other known edible plasticizing substances.

Any oil component previously employed for such products is contemplated as suitable for the present invention. This oil component may comprise any edible water-immiscible oleaginous substance, provided that it is in liquid condition when dispersed throughout the gell-like mass. Thus, it is possible to use fats which are plastic at room temperature but which may be made suitable for purposes of this invention by warming them above the melting point. Of course, these materials would not be heated to a temperature which would denature, char, burn, or otherwise harm any of the associated components. The oil component may comprise any type of vegetable or animal oil or fats or mixtures thereof, including, for example, cottonseed oil, corn oil, lard, peanut oil, soy oil, safflower oil, butter, butter oil, or margarine. Quantities of the oil component previously employed in the art have been found suitable for the products of this invention for example, amounts ranging from about 35% to 70% dry weight. Excess amounts of oil, for example, above about 75% should be avoided since the oil has a tendency to bleed from the product at these high levels.

As previously described, the slurry formed by intermixing the film-forming component and oil component is hydrated with water and vigorously agitated until a viscous and stable dispersion results. The amount of water required to form a stable dispersion depends heavily on the particular film-forming component employed, as is demonstrated in the examples included hereinafter. In the practice of this invention, it has been found that excess amounts of water are preferably avoided while forming the dispersion in order to achieve maximum moisture resistance in the product. Hence, the minimum amount of water required to form a stable dispersion with the particular film-former is recommended to obtain the best results. This minimum quantity may be readily determined by preparing a series of test dispersions, first estimating the quantity of water needed and then gradually reducing that amount until a smooth dispersion can no longer be formed. In general, acceptable moisture resistance may be achieved using a preferred wheat germ-albumin film-forming component with about 15–40% water on a formula weight basis.

As set forth before and in the previously mentioned U.S. Pat. Nos. 3,872,229 and 3,872,230, it was found that mixing the dispersion without gas contact produces a more dense and texturally superior product which required less water to form a stable dispersion. In general, the mixing procedures disclosed in the above patents are applicable to the practice of the present invention and the details of such mixing procedures are herein incorporated by reference. It has been found that minor changes in the mixing procedure such as changes in mixing speed, vacuum level, method of water addition, etc., do not have a significant effect on the moisture resistance of the final product.

In accordance with known procedures, the dispersion once formed may be spread or extruded into sheets, strips, pieces, etc., which are about $\frac{1}{8}''-\frac{1}{4}''$ in thickness, and may be cut or molded into a variety of shapes and forms depending on the ultimate use of the product. Preferably the cut pieces have the dimensional characteristics and appearance of the natural nutmeat which is being simulated.

After forming, the product may be subjected to a temperature sufficient to dry the product to a nut-like texture, e.g. a moisture content below about 10%, and also sufficient to coagulate or denature that portion of the film-former which is so adapted in accordance with this invention. Of course, throughout the process prior to coagulation of the film-former, the temperature must be kept sufficiently low to prevent premature coagulation. As an example, when dried egg albumin is used as the source of heat coagulable film-former, the temperature should remain below its coagulation temperature of about 110° F. during the mixing procedure, and then be elevated above that temperature for drying the dispersion after forming into the desired shape.

Since the moisture is present in the continuous cellular film portion, a considerable period of time must be allotted for this final drying. The larger or thicker the formed dispersion, the longer the time required for effecting the drying. A circulating air oven set at a temperature somewhat below the boiling point of water, e.g. 170° F. to 180° F. has been found to be adequate for drying the cellular film, and drying usually takes place over a period of 4–20 hours. Other forms of drying may also be used, such as microwave drying. Generally, if the pieces are subjected to temperatures above the boiling point of water, the pieces will puff and, therefore, no longer resemble nutmeats. It should be noted that at higher temperatures; for example, above about 180° F. some degree of roasting of the simulated nutmeat may take place, which may or may not be desirable. Also as previously mentioned, under proper process conditions, even higher temperatures may be advantageous during or after drying to accomplish heat coagulation of certain film-formers.

Drying converts the product to relatively hard, crispy pieces that have the crunch followed by a smearing sensation which simulates almost precisely the texture and chewing characteristics of natural nuts. Dispersing the oil component throughout the continuous phase of hydrated film-former results in a gell-like mass which slowly dries with the oil globules in situ whereby the hydrated film-former is gradually dehydrated and thereby hardened without displacing any of the oil. If steam or oil vapor pressure is created through the application of too high a temperature during drying, the cellular structure will rupture and the oil particles will coalesce and bleed from the product. Hence, as stated, the drying is usually conducted over a relatively long period of time. The length of drying time has been found to be, at least in part, determinative of the initial texture of the simulated nutmeat since the moisture remaining in the product acts as a plasticizer. Therefore, longer drying times (less moisture) result in harder textures and shorter drying times (more moisture) result in softer textures. However, as previously discussed, the effects of this moisture are not permanent and will vary as the simulated nutmeat piece equilibrates with the humidity of the environment. Hence, the time which the product is dried may be used to adjust the initial hardness of the product at room temperature and humidity in order to simulate the texture of a certain variety of nutmeat when eaten "out of hand".

The initial moisture level does not affect the texture of the nut after exposure to high moisture conditions since the moisture level of the product without the benefit of the present invention tends to equilibrate with its environment and become soggy. Nonetheless, the present invention may be combined with this technique for controlling initial texture to provide a single product with a wide variety of commercial applications. For example, the characteristics of a pecan may be simulated when eaten individually by drying a dispersion 5-6 hours at about 180° F. to a moisture content of about 2% to 4% and then, since the dispersion was formulated in accordance with the present invention, the same product would retain this pecan-like texture in a moist baked good where prior art simulated nutmeats would have become soggy.

The simulated nutmeats of the present invention offer a range of product applications heretofore unavailable because of the tendency of prior art simulated nutmeats to soften excessively in food products having high moisture content, for example, baked goods, puddings, gelatins, etc. The present products are uniquely suited for use in such high moisture food products, and particularly, in relatively moist baked goods such as breads, cakes, brownies, pastries, muffins, etc. Due to their superior moisture resistance properties, the products of the present invention have the ability to be included in such products and retain their characteristic texture.

From the foregoing, it will be appreciated that in accordance with the teachings of this invention, a moisture resistance superior to that exhibited by simulated nutmeats in the past may be achieved, in the absence of an excess amount of permanent plasticizer, through the use of an irreversibly heat-coagulable film-former. Although the invention in its broadest aspects is applicable generally to all simulated nutmeat products prepared as previously described from a dispersion of oil droplets in a continuous phase of hydrophilic film-former, the following more detailed description will concentrate, without intending to limit the invention, on those preferred products which are intended for use in moist baked goods and which utilize preferred proteinaceous film-forming components.

The prior art teaches that the various components of the simulated nutmeat may vary widely. However, as previously set forth, it has been found that control of certain aspects of the formulation is advantageous in achieving optimum moisture resistance in accordance with this invention. For example, preferred simulated nutmeat products of the invention are formulated so as to be particularly suited for use in the aforementioned moist baked goods. As used herein, the term "moist" is intended to designate a baked good having a moisture level of about 20% water or greater. This class of "moist" baked goods includes such products as breads (about 30-36%), muffins (about 30-40%), cakes (about 20-32%), and rolls (about 20-38%). Of course, the products of the invention may be employed with equal success in baked goods having lower moisture levels, e.g. cookies (about 2-10%) and brownies (about 9-13%), as can most of the simulated nutmeats of the prior art. The moisture levels for most conventional baked goods are available, for example, in USDA Handbook No. 8.

A particularly useful advantage of the moisture resistant simulated nutmeats of the invention is that they may be included in a dry convenience baking mix to which water and other ingredients are added to form a batter or dough which is subsequently baked in an oven to produce, for example, a nut bread product. As shown above, baked goods of this type are quite moist, for example, possessing moisture levels in excess of 20% and frequently above about 30%. To be acceptable in applications of this type, the simulated nutmeat must exhibit in the baked good a taste, texture, and appearance which closely approximates the nutmeat which it is replacing. As previously set forth, the present invention provides a simulated nutmeat which will not soften excessively in the high-moisture environment of the baked good and, thus, will retain in such goods the crunchy texture of the natural nutmeat.

If the ingredients and procedures are selectively employed in accordance with practices described herein and the prior art, the finished product may be used to simulate different varieties of nutmeats. Conventional food coloring and commercially available nut flavors, or in the alternative, some other flavor such as chocolate, fruit, etc., may be employed in the required amount to impart the desired color, flavor, and/or aroma to the products. The color and/or flavor may be used in a coating or directly in the dispersion or both.

Different varieties of natural nuts may be characterized organoleptically by their texture, particularly their hardness, when chewed. For example, on a scale from 1 (very soft) to 10 (very hard), the hardness of a cashew nut may be rated as a 4, a pecan rated as a 6, a walnut as an 8, etc. As previously mentioned, the simulated nutmeat must achieve and maintain the characteristic hardness level of the natural nut which it is replacing if it is to successfully function as a replacement for that natural nut. Therefore, one useful technique for evaluating the moisture resistance of a simulated nutmeat product is to bake a loaf of bread from a dry mix containing pieces of the product to be tested uniformly distributed throughout the loaf and then allow the bread to be stored for a period of time representative of its normal shelf-life. Samples of the product may then be randomly selected from the loaf, chewed and the perceived hardness rated on a scale such as described above. It has been found that with experienced testers this technique can produce accurate and repeatable results.

The hardness of the product after exposure to a moist atmosphere may also be determined empirically using commercially available hardness measuring instruments. One particularly useful instrument for this purpose is manufactured by the Instron Corporation, Canton, Massachusetts, which measures the force required on a knife-like blade to shear a standard size sample of the product selected from the loaf of bread after storage. It has been found that these instrument measurements positively correlate with the organoleptic ratings assigned by experienced testers and preferably the two techniques are used in combination to evaluate the hardness levels of the products being tested.

The invention will now be illustrated by reference to the following examples, which are intended to be merely illustrative and not limiting of the invention.

EXAMPLES I-III (PRIOR ART)

For comparative purposes, representative prior art simulated nutmeats were prepared essentially using the formulations and procedure set forth in Examples IB, II and III in U.S. Pat. No. 3,872,229.

Formulae:

EXAMPLE I

|  | Formula % | % Dry Product | % Heat-Coag. film-former (Dry Wt.) | % Plasticizer (Dry Wt.) |
|---|---|---|---|---|
| Ground Dried Wheat Germ | 23.20 | 31.56 | 2.93 | 5.24 |
| Dried Egg Albumin | 4.60 | 6.26 | 5.01 | — |
| Soy Oil | 39.70 | 54.02 | — | — |
| Sucrose | 6.00 | 8.16 | — | 8.16 |
| Water | 26.50 | — | — | — |
| Total | 100.00 | 100.00 | 7.94 | 13.40 |

EXAMPLE II

|  | Formula % | % Dry Product | % Heat-Coag. film-former (Dry Wt.) | % Plasticizer (Dry Wt.) |
|---|---|---|---|---|
| Dried Egg Albumin | 9.87 | 12.06 | 9.65 | — |
| Sodium Caseinate | 4.73 | 5.78 | — | — |
| Sucrose | 15.51 | 18.95 | — | 18.95 |
| Corn Starch | 12.40 | 15.15 | — | — |
| Soy Oil | 39.34 | 48.06 | — | — |
| Water | 18.15 | — | — | — |
| Total | 100.00 | 100.00 | 9.65 | 18.95 |

EXAMPLE III

|  | Formula % | % Dry Product | % Heat coag. film-former (Dry Wt.) | % Plasticizer (Dry Wt.) |
|---|---|---|---|---|
| Dried Ground Wheat Germ | 25.50 | 35.97 | 3.34 | 5.97 |
| Dried Egg Albumin | 5.10 | 7.19 | 5.75 | — |
| Sucrose | 6.70 | 9.45 | — | 9.45 |
| Soy Oil | 33.60 | 47.39 | — | — |
| Water | 29.10 | — | — | — |
| Total | 100.00 | 100.00 | 9.09 | 15.42 |

NOTE: Wheat germ is considered to have 9.3% heat-coagulable film-former and 16.6% permanent plasticizer in all examples set forth herein.

Procedure:

The dry materials and soy oil were placed in a conventional sigma blade-type mixer and mixed for five minutes at low speed until evenly distributed. All the water was added at one time, the mixer was closed and 28" Hg gauge of vacuum pulled. The mixer temperature was 72° F. The materials were mixed at high speed for 15 minutes and a thick gelatinous, stable dispersion formed. This product was then extruded as ribbed strips, about ⅛" thick, onto teflon-lined sheets and heat set for 15 minutes in an air circulating oven set at 185° F. These strips were cut into ¼" length pieces and placed on stainless steel screens and dried in an air circulating oven set at 185° F. for 10 hours.

The resultant simulated nutmeat pieces were then mixed with a commercially available dry "Quick Bread" mix marketed by The Pillsbury Company (basically comprising enriched bleached flour, sugar, shortening, leavening and other conventional baking mix ingredients), along with one cup of water and a whole egg, to form a batter which was poured into a bread pan and baked in an oven at 375° F. for about 30 minutes. Each of the two baked loaves containing a plurality of the uniformly distributed simulated nutmeat pieces was then stored for 48 hours at room temperature and humidity.

Samples were randomly selected from the center of each loaf and evaluated for hardness organoleptically and by instrument measurement. The organoleptic rating was determined by an experienced tester actually biting the sample and assigning its perceived hardness a value on a scale ranging from 1 (very soft) to 10 (very hard). Statistically, it was determined that for this tester, the 95% confidence interval associated with the mean hardness value obtained from the above procedure was on the order of ±0.3–0.4 units. An instrument measurement of hardness was accomplished using a conventional hardness measuring instrument manufactured by the Instron Corporation. The amount of force required to shear the sample piece using a standard V-shaped cutting blade as read on the scale of the Instron machine was taken as the "Instron" hardness reading. The results of each type of hardness evaluation is tabulated below:

|  | Organoleptic | Instron |
|---|---|---|
| Example I | 2.5 | 566 gms |
| Example II | 2.8 | 833 gms |
| Example III | 2.5 | 619 gms |

Each of the samples had a soft and mushy texture which did not resemble that of a natural nutmeat.

EXAMPLE IV

The same procedure set forth in the above prior art examples was followed using the following formula embodying the present invention:

| Formula: | Formula % | % Dry Product | % Heat-coag. film-former (Dry Wt.) | % Plasticizer (Dry Wt.) |
|---|---|---|---|---|
| Ground Dried No. 1 Wheat Germ | 23.17 | 30.00 | 2.79 | 4.98 |
| Dried Egg Albumin | 9.96 | 12.90 | 10.97 | — |
| Soy Oil | 44.09 | 57.10 | — | — |
| Water | 22.78 | — | — | — |
| Total | 100.00 | 100.00 | 13.76 | 4.98 |

As in the previous samples, the simulated nutmeats pieces were baked in duplicate loaves of bread, stored for 48 hours, and samples evaluated for hardness both organoleptically and by Instron machine. The products of the above formulation had a firm and crunchy texture similar to that of pecans. The organoleptic score averaged 6.25 (a natural pecan scores about 6.0) and the Instron hardness was determined to be about 1942 gms.

EXAMPLE V

The same procedure as used in Example IV above was repeated substituting Solac (a commercially available product containing 80% lactalbumin and 8% lactose) for the egg albumin of Example IV. The formula was as follows:

| Formula: | Formula % | % Dry Product | % Heat-coag. film-former (Dry Wt.) | % Plasticizer (Dry Wt.) |
|---|---|---|---|---|
| Ground Dried No. 1 Wheat Germ | 23.17 | 30.00 | 2.79 | 4.98 |
| Solac (80% lactalbumin, 8% lactose) | 10.58 | 13.71 | 10.97 | 1.10 |
| Soy Oil | 43.47 | 56.29 | — | — |
| Water | 22.78 | — | — | — |
| Total | 100.00 | 100.00 | 13.76 | 6.08 |

After preparing, baking in duplicate loaves of bread, storing for 48 hours, and evaluating, all as set forth in the previous examples, the simulated nutmeat products of the above formulation exhibited a firm, nut-like texture with an organoleptic score of 5.16 and an Instron force reading of 1680 gms.

It is clear from a comparison of the results of the immediately foregoing examples with those of the prior art that a dramatic increase was achieved in the hardness of the simulated nutmeat products after remaining 48 hours in the baked bread product by modifying the prior art formulations in accordance with the present invention. As can be seen, the formulae of Examples IV and V differ from those of Examples I, II, and III in two important aspects; i.e., the products of the invention contain (1) more heat-coagulable film-former, and (2) less permanent plasticizer relative to the amount of that film-former.

It may be noted that the formulae of Examples IV and V contain more total film-forming component than does the formulations in Examples I, II, or III taken from the prior art. Although it has been found that an increase in the total amount of film-former used will increase the moisture resistance of the subject simulated nutmeats to some extent, this factor alone does not account for the dramatic improvements achieved in the moisture resistance of the products of this invention over those of the prior art. The following examples provide products having the same quantity of film-former, but insufficient amounts of a film-former having the required heat-coagulable properties.

EXAMPLES VI AND VII

Essentially the formulation and procedure of Example IV was repeated except that in Example VI gelatin, and in Example VII calcium caseinate (film-formers without heat-coagulable properties under the conditions of the test) were substituted for egg albumin to give the same total amount of film-former as in Example IV:

EXAMPLE VI

| Formula-: | Formula % | % Dry Product | % film-former (Dry Wt.) | % Plasticizer (Dry Wt.) |
|---|---|---|---|---|
| Ground Dried Wheat Germ | 22.56 | 30.00 | 2.79 | 4.98 |
| Dried Gelatin (225 Bloom) | 9.70 | 12.90 | 11.09 | — |
| Soy Oil | 42.93 | 57.10 | — | — |
| Water | 24.81 | — | — | — |
| Total | 100.00 | 100.00 | 13.88 | 4.98 |

EXAMPLE VII

| | Formula % | % Dry Product | % film-former (Dry Wt.) | % Plasticizer (Dry Wt.) |
|---|---|---|---|---|
| Ground Dried Wheat Germ | 19.23 | 30.00 | 2.79 | 4.98 |
| Calcium Caseinate | 7.81 | 12.18 | 10.96 | — |
| Soy Oil | 37.06 | 57.82 | — | — |
| Water | 35.90 | — | — | — |
| Total | 100.00 | 100.00 | 13.75 | 4.98 |

| | Hardness after 48 hours in a nut bread | |
|---|---|---|
| | Organoleptic | Instron |
| Example IV | 6.3 | 1942 gms |
| Example V | 5.2 | 1680 gms |
| Example VI | 2.8 | 385 gms |
| Example VII | 3.8 | 1171 gms |

All of the above products have the same total amount of film-forming component, yet those of Examples IV and V having the heat-coagulable film-former exhibit drastically improved moisture resistance over those that have an equal amount of non-heat-coagulable film-former. The required quantity of film-former having heat-coagulable properties will be dependent on a variety of factors including the particular film-former used, the amount and type of other ingredients present and the ultimate texture and moisture resistance goal. Generally, with all other factors remaining constant, the more heat coagulable film-former employed in the formulation, the harder the texture of the simulated nutmeat when employed in a moist baked good. Given the teachings of the present invention, e.g. with regard to the amount of permanent plasticizer which can be present, the absolute quantity of heat-coagulable film-former which is necessary in a particular formulation will be mainly a matter of choice for one skilled in the art. The following example illustrates the effect of varying the amount of heat-coagulable film-former in one preferred system:

EXAMPLE VIII

As in the previous examples, the formula and procedure of Example IV were repeated, except that in the present example, the amount of heat coagulable film-former (and other ingredients) provided by wheat germ was kept at a constant level whereas the amount provided by egg albumin was systematically reduced and replaced by calcium carbonate, an inert edible filler material at neutral pH values. The amount of oil and water in each instance was the same as previously shown in Example IV.

Simulated nutmeat pieces from each formulation were baked in loaves of bread, stored for 48 hours and evaluated for hardness both organoleptically and by Instron Machine. The results are tabulated below:

| % Heat-coag. film-former (dry wt.) | | % CaCO$_3$ (dry wt.) | Organoleptic Score | Instron Score |
|---|---|---|---|---|
| Wheat Germ | Egg Albumin | | | |
| 2.79 | 10.97 | 0.0 | 6.25 | 1942 |
| 2.79 | 8.97 | 2.4 | 5.88 | 1582 |
| 2.79 | 7.00 | 4.7 | 5.31 | 1164 |
| 2.79 | 5.00 | 7.05 | 4.89 | 1026 |
| 2.79 | 3.00 | 9.4 | 4.38 | 628 |
| 2.79 | 1.00 | 11.7 | 2.81 | 686 |

It is clearly shown by the above results that the hardness which is achieved after prolonged storage in the high moisture environment of a loaf of bread is directly proportional to the amount of heat-coagulable film-former which is present. Since it is desirable to have a variety of hardness levels and moisture resistance properties depending on the natural nutmeat being simulated and the contemplated product application, the capability to so tailor this property by varying the level of heat-coagulable film-former is an important aspect of this invention.

As previously stated, a second important element in achieving the improved moisture resistance of the invention is the amount of permanent plasticizer present in the formulation relative to the amount of heat-coagulable film-former. It has been found that the moisture resistance of the subject simulated nutmeat products is inversely proportioned to the amount of permanent plasticizer present in the formulation, i.e. with other factors remaining constant, the more permanent plasticizer present, the less moisture resistant the resultant product. It has also been found that the improvements in moisture resistance achieved by the heat-coagulable film-former will in effect be canceled out if the quantity of permanent plasticizer in the formulation is in excess of the quantity of heat-coagulable film-former.

The following examples will illustrate the effect of varying amounts of permanent plasticizer on the moisture resistance of products otherwise having the same formulation (i.e. that of Example IV):

EXAMPLES IX AND X

Again using the procedure of the previous examples, simulated nutmeat pieces were prepared from the following formulations, baked in duplicate loaves of bread, stored for 48 hours, and evaluated:

| Formulae: | EXAMPLE IX | | | |
|---|---|---|---|---|
| | Formula % | % Dry Product | % Heat-coag. film-former (Dry Wt.) | % Plasticizer (Dry Wt.) |
| Ground Dried Wheat Germ | 23.62 | 30.00 | 2.79 | 4.98 |
| Dried Egg Albumin | 10.16 | 12.90 | 10.97 | — |
| Soy Oil | 40.24 | 51.10 | — | — |
| Sucrose | 4.72 | 6.00 | — | 6.00 |
| Water | 18.04 | — | — | — |
| TOTAL | 100.00 | 100.00 | 13.76 | 10.98 |

| | EXAMPLE X | | | |
|---|---|---|---|---|
| | Formula % | % Dry Product | % Heat-coag. film-former (Dry Wt.) | % Plasticizer (Dry Wt.) |
| Ground Dried Wheat Germ | 24.59 | 30.00 | 2.79 | 4.98 |
| Dried Egg Albumin | 10.57 | 12.90 | 10.97 | — |
| Soy Oil | 32.05 | 39.10 | — | — |
| Sucrose | 14.75 | 18.00 | — | 18.00 |
| Water | 18.04 | — | — | — |
| Total | 100.00 | 100.00 | 13.76 | 22.98 |

| | | Hardness after 48 hours in a nut bread | |
|---|---|---|---|
| Results: | % Permanent Plasticizer | Organoleptic | Instron |
| Example IV | 4.98 | 6.25 | 1942 |
| Example IX | 10.98 | 5.4 | 1744 |
| Example X | 22.98 | 3.2 | 1149 |

These results clearly show the detrimental effects of a permanent plasticizer such as sucrose on the moisture resistance of a simulated nutmeat particularly when the amount of plasticizer exceeds the amount of heat-coagulable film-former.

However, it should be noted that the simulated nutmeat products of this invention need not be completely void of any permanent plasticizer, but rather the formulation must avoid an amount which would deleteriously affect the moisture resistant effects of the heat-coagulable film-former. As previously discussed and demonstrated, this deleterious amount has been found to be a quantity which is excess of the total amount of heat-coagulable film-former present. Indeed, the softening effects achieved by a limited amount of permanent plasticizer may be desirable in preferred embodiments to achieve a product which has a better (less hard) texture when eaten "out of hand" as well as improved moisture resistance. At this point, it should be noted that, as previously discussed, a certain amount of control over out-of-hand eating characteristics may also be achieved by varying the drying time and, therefore, the initial moisture content of the products. For example, the out-of-hand eating characteristics of the products produced in the above samples were improved by drying the products to a moisture level of 4% rather than 2% or lower.

It has been previously stated that use of the minimum amount of water required to form a stable dispersion is preferable when the film-former is hydrated and agitated to disperse the oil therein. It has been found that excess quantities of water present during the formation of the dispersion not only may reduce the moisture resistant properties of the ultimate product, but may also affect overall textural characteristics. The following example illustrates this effect.

EXAMPLE XI

The same procedure, ingredients, and dry weight formula as used in Example IV were employed, except that about 13% more water was used to form the dispersion. This quantity represents approximately the amount of water which was required for the calcium caseinate in Example VII above. The formula was:

| | Formula % | % Dry Product | % Heat-coag. film-former (Dry Wt.) | % Plasticizer (Dry Wt.) |
|---|---|---|---|---|
| Dried Ground Wheat Germ | 19.23 | 30.00 | 2.79 | 4.98 |
| Dried Egg Albumin | 8.27 | 12.90 | 10.97 | — |
| Soy Oil | 36.60 | 57.10 | — | — |
| Water | 35.90 | — | — | — |
| Total | 100.00 | 100.00 | 13.76 | 4.98 |

| Results | Hardness after 48 hours in a nut bread | |
|---|---|---|
| | Organoleptic | Instron |
| Example IV | 6.2 | 1942 |
| Example XI | 5.2 | 1430 |

The resultant dispersion had a much lower viscosity than that of Example IV and it was difficult to extrude uniform strips. After heat setting, drying, baking in loaves of bread, and storing for 48 hours as in previous examples, the pieces were quite firm; however, there was a considerable reduction in hardness from that obtained in Example IV. In addition, the texture was mealy and not nut-like in character. These results indicate that, while it may be possible to obtain a moisture resistant product in accordance with this invention when an excess amount of water is used to form the dispersion, it is preferred to use only the minimum amount of water necessary to achieve a stable dispersion.

Since certain changes may be made in the above product and process without departing from the scope of the invention, it is intended that the matter contained in the above description and examples be interpreted as illustrative and not in a limiting sense.

What is claimed is:

1. In a process of the type wherein a hydratable film-forming component is intermixed with a water-immiscible oil to form a slurry, water is added to said slurry with agitation under essentially gas-free conditions in an amount sufficient to hydrate said film-forming component and form thereby a stable dispersion of oil droplets uniformly distributed in a continuous phase of hydrated film-forming component, and said dispersion is subsequently dried to form a nut-like food product retaining a cellular structure, the improvement which comprises:
   employing as at least a portion of said film-forming component a film-former adapted to irreversibly heat-coagulate;
   limiting the amount of any permanent plasticizer present in said product to a quantity no greater than the amount of said irreversibly heat-coagulable film-former; and
   exposing said dispersion to conditions sufficient to irreversibly heat-coagulate said film-former so adapted, thereby rendering said product substantially more resistant to softening in high-moisture environments.

2. The process of claim 1 wherein said heat-coagulable film-former is proteinaceous.

3. The process of claim 2 wherein said heat-coagulable proteinaceous film-former comprises an albumin protein in a quantity equal to about 5–20% dry weight.

4. The process of claim 3 wherein said dispersion is dried at a temperature in excess of 110° F. to a moisture content less than 10%.

5. The process of claim 4 wherein said dispersion is dried at a temperature of about 180° F. to a moisture content of from 2% to 4%.

6. The process of claim 1 wherein the minimum amount of water required to form a stable dispersion is used to hydrate said film-forming component.

7. The process of claim 6 wherein said amount of water is from 15–40% on a formula weight basis.

8. The process of claim 1 wherein said film-former comprises wheat germ.

9. The process of claim 8 wherein the globulin proteins of said wheat germ are adapted to heat-coagulate by hydrating said wheat germ with a dilute salt solution.

10. The process of claim 1 wherein said dispersion is subjected to temperatures of 250°–300° F. for less than a minute in a microwave oven after drying.

11. The process of claim 1 wherein the hardness of said product after storage in a high-moisture environment is increased or decreased by employing respectively more or less of said heat-coagulable film-former.

12. The process for preparing a moisture resistant synthetic nutmeat product comprising the steps of:
   intermixing to form a slurry, an edible hydratable film-forming component comprising an irreversibly heat-coagulable film-former in a quantity equal to about 5–20% of the dry weight of said product, and an edible water-immiscible oil component in a quantity equal to about 35–70% of the dry weight of said product;
   adding water to said slurry in an amount equal to about 15–40% of the formula weight to hydrate said film-forming component;
   agitating said slurry under essentially gas free conditions to form a stable dispersion of oil droplets uniformly distributed in a continuous phase of hydrated film-forming component;
   limiting the amount of permanent plasticizer present in the product to a quantity no greater than the amount of said heat-coagulable film-former; and
   drying said dispersion at a temperature sufficient to irreversibly heat-coagulate said film-former so adapted thereby decreasing the propensity of said product to be softened by the uptake of moisture from its environment.

13. An edible moisture-resistant simulated nutmeat composition which comprises:
   an edible hydratable film-forming component in dried continuous phase comprising an irreversibly heat-coagulated film-former in a quantity equal to about 5–20% of the dry weight of said product;
   an edible water-immiscible oil component uniformly dispersed as droplets in said dried film-forming component in a quantity equal to about 35–70% of the dry weight of said product; and
   non-film-forming filler material in a quantity equal to about 0–40% of the dry weight of said product, said filler material comprising no permanent plasticizer in excess of the total amount of said irreversibly heat-coagulable film-former present.

14. The product of claim 13 wherein said film-former is proteinaceous.

15. The product of claim 14 wherein said irreversibly heat-coagulable film-former comprises an albumin protein.

16. The product of claim 15 wherein said albumin protein is dried egg albumin or lactalbumin.

17. The product of claim 13 wherein said irreversibly heat-coagulable film-former comprises wheat germ.

18. The product of claim 13 wherein said film-forming component further comprises a caseinate.

19. The product of claim 13 wherein said permanent plasticizer is a sugar.

20. The product of claim 13 wherein said product contains less than 10% moisture.

21. The product of claim 12 wherein said product possesses a nut-like texture which is harder than that of a cashew when included in a food product having a moisture content from 20–40%.

* * * * *